(12) United States Patent
Hori

(10) Patent No.: US 8,672,548 B2
(45) Date of Patent: Mar. 18, 2014

(54) FLUID DYNAMIC BEARING DEVICE AND MANUFACTURING METHOD THEREFOR

(75) Inventor: Masaharu Hori, Kuwana (JP)

(73) Assignee: NTN Corporation, Osaka-shi, Osaka (JP)

(*) Notice: Subject to any disclaimer, the term of this patent is extended or adjusted under 35 U.S.C. 154(b) by 146 days.

(21) Appl. No.: 13/062,902

(22) PCT Filed: Aug. 20, 2009

(86) PCT No.: PCT/JP2009/064599
§ 371 (c)(1),
(2), (4) Date: Mar. 8, 2011

(87) PCT Pub. No.: WO2010/029840
PCT Pub. Date: Mar. 18, 2010

(65) Prior Publication Data
US 2011/0170813 A1  Jul. 14, 2011

(30) Foreign Application Priority Data
Sep. 9, 2008  (JP) ................................ 2008-231212

(51) Int. Cl.
*F16C 32/06* (2006.01)

(52) U.S. Cl.
USPC ........................................ 384/100; 384/107

(58) Field of Classification Search
USPC ................ 384/100, 107, 114, 121, 119, 124; 310/90; 360/99.07, 99.08
IPC ...................................................... F16C 36/02
See application file for complete search history.

(56) References Cited

U.S. PATENT DOCUMENTS

| | | | |
|---|---|---|---|
| 6,499,882 B2* | 12/2002 | Takahashi et al. | 384/107 |
| 6,921,208 B2* | 7/2005 | Yamashita et al. | 384/107 |
| 7,088,023 B1* | 8/2006 | Gomyo et al. | 310/90 |
| 7,101,084 B2* | 9/2006 | Gomyo | 384/107 |
| 7,147,376 B2* | 12/2006 | Shimizu et al. | 384/107 |
| 7,345,392 B2* | 3/2008 | Hafen et al. | 310/90 |
| 7,431,505 B2* | 10/2008 | Shibahara et al. | 384/100 |
| 2006/0202577 A1* | 9/2006 | Maekawa et al. | 310/90 |
| 2007/0019894 A1* | 1/2007 | Yamamoto | 384/107 |
| 2007/0024136 A1* | 2/2007 | Saito et al. | 310/90 |

(Continued)

FOREIGN PATENT DOCUMENTS

| | | |
|---|---|---|
| CN | 101002032 A | 7/2007 |
| JP | 2003-239974 A | 8/2003 |

(Continued)

OTHER PUBLICATIONS

WO2008/065780 A1—Machine Translation Document.*

(Continued)

*Primary Examiner* — Thomas R Hannon
(74) *Attorney, Agent, or Firm* — Westerman, Hattori, Daniels & Adrian, LLP

(57) ABSTRACT

To increase fixation strength of a bearing sleeve with respect to a bottomed cylindrical housing, a fluid dynamic bearing device (1) is provided with a bottomed cylindrical housing (7), a bearing sleeve (8) fixed to an inner periphery thereof, and a shaft member (2) inserted along an inner periphery of the bearing sleeve (8). An adhesive pool (11) is provided between an inner peripheral surface (7*a*2) of a smaller diameter portion (7*a*) of the housing (7) and an outer peripheral surface (8*d*) of the bearing sleeve (8), which are opposed to each other. Further, an inner peripheral chamfer (7*f*) continuous with the adhesive pool (11) is provided on an inner peripheral portion of the housing (7), and a first tapered space (12) formed between the inner peripheral chamfer (7*f*) and the bearing sleeve (8) is sealed with an adhesive (13).

7 Claims, 5 Drawing Sheets

(56) References Cited

U.S. PATENT DOCUMENTS

| | | |
|---|---|---|
| 2007/0025652 A1* | 2/2007 | Satoji et al. .................. 384/100 |
| 2007/0177831 A1* | 8/2007 | Shibahara .................... 384/107 |
| 2007/0286538 A1* | 12/2007 | Mizutani ...................... 384/112 |
| 2008/0203838 A1* | 8/2008 | Komori et al. ................ 310/90 |
| 2008/0291574 A1 | 11/2008 | Obara |
| 2010/0002966 A1 | 1/2010 | Hori et al. |

FOREIGN PATENT DOCUMENTS

| | | |
|---|---|---|
| JP | 2007-016922 A | 1/2007 |
| JP | 2008-138713 A | 6/2008 |
| WO | 2008/065780 A1 | 6/2008 |

OTHER PUBLICATIONS

International Search Report of PCT/JP2009/064599, date of mailing Nov. 10, 2009.

Chinese Office Action dated Oct. 10, 2012, issued in corresponding Chinese patent application No. 200980134699.8, w/ partial English translation.

Notification of Transmittal of Translation of the International Preliminary Report on Patentability (Form PCT/IB/338) of International Application No. PCT/JP2009/064599 mailed Apr. 28, 2011 with Forms PCT/IB/373 and PCT/ISA/237.

* cited by examiner

FLUID DYNAMIC BEARING DEVICE AND MANUFACTURING METHOD THEREFOR

TECHNICAL FIELD

The present invention relates to a fluid dynamic bearing device and a manufacturing method therefor.

BACKGROUND ART

A fluid dynamic bearing device rotatably supports, with oil films formed in bearing gaps, a member on a rotary side (a shaft member, for example) with respect to a member on a fixation side. The fluid dynamic bearing device features high-speed rotation, excellent rotational accuracy, quietness, and the like. In recent years, by taking advantage of those features, the fluid dynamic bearing device is suitably used as a bearing device for a motor to be mounted to various electrical apparatuses such as information apparatuses. Specifically, as a bearing device for a motor, the fluid dynamic bearing device is suitably used in the following: a spindle motor for a magnetic disk drive such as an HDD, an optical disk drive for a CD-ROM, CD-R/RW, DVD-ROM/RAM, or the like; a polygon scanner motor of a laser beam printer (LBP); or a fan motor for a PC or the like.

For example, JP 2003-239974 A (Patent Document 1) discloses a fluid dynamic bearing device used while being incorporated in a spindle motor for a disk drive, which includes a housing, a bearing sleeve fixed to an inner periphery of the housing, a shaft member inserted along an inner periphery of the bearing sleeve, and radial bearing portions with which the shaft member is supported in a radial direction by oil films formed in radial bearing gaps between an inner peripheral surface of the bearing sleeve and an outer peripheral surface of the shaft member, the oil films being formed in accordance with a relative rotation of the bearing sleeve and the shaft member. In the fluid dynamic bearing device, for the purpose of reducing the number of components and the number of assembly steps, the housing is formed as a molded product having a bottomed cylindrical shape (cup shape) with one open end and another end closed with a bottom portion integrally provided.

RELATED ART DOCUMENT

Patent Document 1: JP 2003-239974 A

DISCLOSURE OF THE INVENTION

Problems to be Solved by the Invention

Incidentally, in accordance with the recent increase in capacity and the like of disk devices, the number of disks mounted to a fluid dynamic bearing device tends to increase (multiple lamination of disks). In order to increase detachment resistance (unmating force) of the shaft member so as to stably maintain rotational accuracy despite an increase in weight in accordance therewith, there is a demand for a further increase in fixation strength of the bearing sleeve with respect to the housing. There are proposed various means as a fixation means for the bearing sleeve with respect to the housing. Actually, bonding excellent in cost-effectiveness is adopted in many cases.

Bonding fixation of the bearing sleeve with respect to the housing is performed, for example, by inserting the bearing sleeve along the inner periphery of the housing while an adhesive is applied to the inner peripheral surface of the housing, and the adhesive is cured thereafter. In this case, when a more adhesive is applied for increasing fixation strength therebetween, in accordance with the insertion of the bearing sleeve, the adhesive is extruded to the forward side (housing closed side) in the insertion direction of the bearing sleeve so as to cause the adhesive to flow around the bearing sleeve onto the housing closed side. In particular, when the bearing sleeve is inserted along the inner periphery of the housing through press-fitting for the purpose of further increasing the fixation strength, the adhesive becomes more liable to occur. When the situation as described above occurs, an amount of the adhesive to be interposed between the housing and the bearing sleeve becomes insufficient, which leads to a risk that required fixation strength (bonding strength) cannot be satisfied. Further, there is another risk that the adhesive having flown around the bearing sleeve intrudes into thrust bearing gaps so as to impair bearing performance of the thrust bearing portions.

An object of the present invention is to provide a fluid dynamic bearing device which is capable of interposing a sufficient amount of the adhesive between the housing and the bearing sleeve so as to increase the fixation strength of the bearing sleeve with respect to housings.

Means for Solving the Problems

In order to solve the above-mentioned problems, the present invention provides a fluid dynamic bearing device, including:

a housing having at least one open end;

a bearing sleeve fixed to an inner periphery of the housing; and a shaft member inserted along an inner periphery of the bearing sleeve, the shaft member being supported in a radial direction by oil films formed in radial bearing gaps between an inner peripheral surface of the bearing sleeve and an outer peripheral surface of the shaft member, the oil films being formed in accordance with a relative rotation of the bearing sleeve and the shaft member, in which:

an adhesive pool is provided between an inner peripheral surface of the housing and an outer peripheral surface of the bearing sleeve, which face each other;

an inner peripheral chamfer continuous with the adhesive pool is provided on an inner peripheral portion of the housing; and a gap between the inner peripheral chamfer and the bearing sleeve is sealed with an adhesive.

As described above, in the fluid dynamic bearing device of the present invention, there is provided an adhesive pool between the inner peripheral surface of the housing and the outer peripheral surface of the bearing sleeve, which are opposed to each other. The adhesive pool of this type can be constituted, for example, by providing the axial region formed by partially increasing an inner diameter dimension of the housing, or by providing the axial region formed by partially decreasing the outer diameter dimension of the bearing sleeve. Further, in the axial region where the adhesive pool is provided, the radial clearance between the inner peripheral surface of the housing and the outer peripheral surface of the bearing sleeve, which are opposed to each other, is larger than that in the other region (axial region in which the bearing sleeve is fixed by press-fitting to the housing, for example). Accordingly, in the axial region in which the adhesive pool is provided, it is possible to decrease an extrusion force of the adhesive to the other end side (bottom side) of the housing at the time of insertion of the bearing sleeve, and hence possible to decrease the amount of the adhesive flowing around the bearing sleeve to the housing closed side as a whole. Meanwhile, after the insertion of the bearing sleeve is completed, an ample amount of the adhesive can be interposed between the inner peripheral surface of the housing and the outer peripheral surface of the bearing sleeve. As a result, it is possible to increase bonding strength therebetween.

In addition, on the inner peripheral portion of the housing in the fluid dynamic bearing device of the present invention, there is provided the inner peripheral chamfer continuous with the adhesive pool. The gap between the inner peripheral chamfer and the bearing sleeve is sealed with the adhesive. With this structure, adjacently to the housing-open side of the adhesive pool, there is formed a space in which the radial dimension thereof is decreased to the housing closed side. Thus, the adhesive supplied in (adhering to) the space can be smoothly supplied to the adhesive pool. Further, it is possible to increase the axial dimension of adhesive layers formed by curing of the adhesive, and hence it is possible to further increase the bonding strength of the bearing sleeve with respect to the housing. With the above-mentioned structure, a sufficient amount of the adhesive can be interposed between the inner peripheral surface of the housing and the outer peripheral surface of the bearing sleeve, which face each other. Thus, it is possible to increase the fixation strength of the bearing sleeve with respect to the housing.

Further, the present invention provides a manufacturing method for a fluid dynamic bearing device including:

a housing having at least one open end;

a bearing sleeve fixed to an inner periphery of the housing; and a shaft member inserted along an inner periphery of the bearing sleeve, the shaft member being supported in a radial direction by oil films formed in radial bearing gaps between an inner peripheral surface of the bearing sleeve and an outer peripheral surface of the shaft member, the oil films being formed in accordance with a relative rotation of the bearing sleeve and the shaft member, the manufacturing method including:

providing an inner peripheral chamfer on an inner peripheral portion of the housing;

inserting the bearing sleeve having an outer peripheral surface applied with an adhesive along the inner periphery of the housing so as to fix the bearing sleeve to the inner periphery of the housing; and supplying an adhesive between the inner peripheral chamfer and the bearing sleeve. With this, movement of the adhesive, which is caused in accordance with the relative movement in the axial direction of the housing and the bearing sleeve, occurs mainly in a direction on a rear side of the insertion direction of the bearing sleeve (housing-open side) in comparison with a front side of the insertion direction of the bearing sleeve. Even when the bearing sleeve is press-fitted onto the inner periphery of the housing, the adhesive is effectively prevented from flowing around the bearing sleeve to the housing closed side.

In this case, it is desirable that the bearing sleeve be inserted along the inner periphery of the housing while a maximum outer diameter of the adhesive applied to the bearing sleeve is maintained to be smaller than a maximum inner diameter of the inner peripheral chamfer. This is because the adhesive is prevented from adhering to the end surface of the housing so that an amount of the adhesive to be interposed between the inner peripheral surface of the housing and the outer peripheral surface of the bearing sleeve, which are opposed to each other, is prevented from decreasing. Note that, it is desirable that the maximum outer diameter of the adhesive thus applied be set to be larger than the minimum inner diameter of the inner peripheral chamfer.

As described above, the adhesive pool can be constituted, for example, by providing the axial region formed by partially increasing an inner diameter dimension of the housing, or by providing the axial region formed by partially decreasing the outer diameter dimension of the bearing sleeve. It is desirable to adopt the former structure, that is, desirable to provide a larger-diameter inner peripheral surface having the opening-side end continuous with the inner peripheral chamfer on the inner peripheral surface of the housing so that the adhesive pool is formed between the larger-diameter inner peripheral surface and the bearing sleeve. This is because the adhesive is smoothly supplied into the adhesive pool because the adhesive pool and the space constituted by the inner peripheral chamfer are linearly overlapped with each other in the axial direction.

Further, in addition to the above-mentioned structure, it is possible to close the other end of the housing with the bottom portion, to provide an outer peripheral chamfer on the outer peripheral portion of the housing closed side (forward side in the insertion direction) of the bearing sleeve, and to seal the gap between the outer peripheral chamfer and the housing with the adhesive. With this, it is possible to interpose the adhesive at both end portions of the fitting region between the housing and the bearing sleeve, and hence fixation strength therebetween is further increased. Note that, in the case of manufacturing the fluid dynamic bearing device structured as described above, it is desirable that the bearing sleeve including the outer peripheral chamfer and having the outer peripheral surface, to which the adhesive is applied, be inserted along the inner periphery of the housing. With this, even when the bearing sleeve is inserted through press-fitting along the inner periphery of the housing, it is possible to insert the bearing sleeve along the inner periphery of the housing while catching abrasion powder generated owing to sliding abrasion between the bearing sleeve and the housing. Thus, it is possible to reliably solve the problem of contaminants generated by the abrasion powder mixed into the bearing inner space.

Incidentally, in the fluid dynamic bearing device of this type, pressure balance of the lubricating oil filling the interior space is disturbed in some cases during the bearing operation. Such a situation leads to problems such as generation of air bubbles involved in local generation of the negative pressure, and leakage of the lubricating oil and occurrence of vibration due to the generation of air bubbles. Those problems can be solved by adopting a structure in which a fluid path open in both end surfaces of the bearing sleeve is provided between the inner peripheral surface of the housing and the outer peripheral surface of the bearing sleeve so that the lubricating oil is caused to flow and communicate in the bearing through the fluid path. However, in some application modes of the adhesive in the structure of the present invention, in which the bearing sleeve is fixed by bonding to the inner periphery of the housing, there is a risk that the adhesive plugging the fluid path makes it difficult to cause the lubricating oil to flow and circulate.

This problem can be solved by intermittently providing sealed portions sealed with the adhesive in the circumferential direction and providing the fluid paths opened in both the end surfaces of the bearing sleeve between the sealed portions adjacent to each other in the circumferential direction. Note that, each of the sealed portions conceptually includes at least the space between the inner peripheral chamfer of the housing and the bearing sleeve, and in some cases, also includes the space between the outer peripheral chamfer on the housing closed side of the bearing sleeve and the housing, the spaces being sealed with the adhesive.

As described above, by adopting the structure of the present invention, in fixing the bearing sleeve to the inner periphery of the housing by bonding, it is possible to effectively prevent the adhesive from flowing around the bearing sleeve to the side opposite to a housing-open side (housing closed side). Thus, as described above, the present invention can be suitably applicable to a fluid dynamic bearing device in which a flange portion is provided to the shaft member, and a thrust bearing gap is formed between the one end surface on the side opposite to the housing-open side of the bearing sleeve and the one surface of the flange portion opposed thereto.

Further, when the structure of the present invention is adopted as described hereinbefore, the housing and the bearing sleeve can be firmly fixed by bonding to each other. Thus, as described above, the present invention is suitable especially to a fluid dynamic bearing device in which the axial fitting length of the housing and the bearing sleeve is shorter than the dimension of the entire axial length of the bearing sleeve.

Effects of the Invention

As described above, according to the present invention, it is possible to interpose interposing a sufficient amount of the adhesive between the housing and the bearing sleeve, and hence possible to increase the fixation strength of the bearing sleeve with respect to the housing so as to provide a fluid dynamic bearing device having excellent durability. Further, it is also possible to effectively reduce the amount of the adhesive flowing around the bearing sleeve to the side opposite to the housing-open side, and hence possible to prevent as much as possible the problem of deterioration in bearing performance caused by the flowing-around of the adhesive.

BEST MODES FOR CARRYING OUT THE INVENTION

In the following, embodiments of the present invention are described with reference to drawings.

Figure 1:
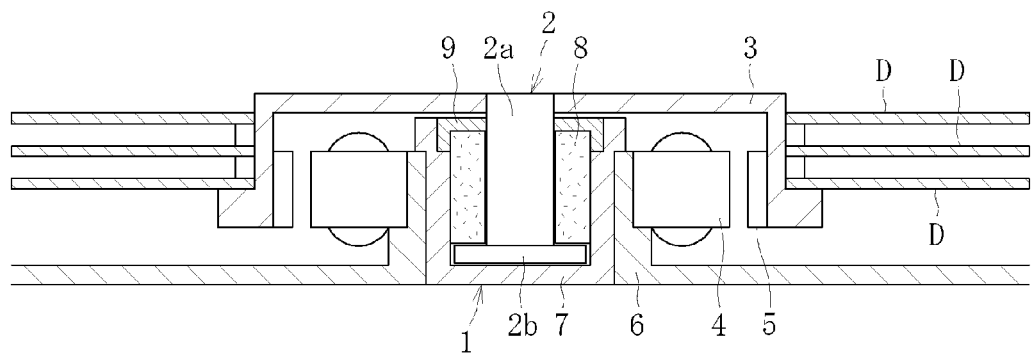
FIG. 1 is a conceptual sectional view of a spindle motor for a disk drive.

FIG. 1 conceptually illustrates a structural example of a spindle motor for information apparatus incorporating a fluid dynamic bearing device. The spindle motor is used for a disk drive such as an HDD and includes a fluid dynamic bearing device 1 for rotatably supporting a shaft member 2, a disk hub 3 fixed to the shaft member 2, a stator coil 4 and a rotor magnet 5 which are opposed to each other through an intermediation of, for example, a gap in a radial direction, and a bracket 6. The stator coil 4 is attached to an outer periphery of the bracket 6 and the rotor magnet 5 is attached to an inner periphery of the disk hub 3. A housing 7 of the fluid dynamic bearing device 1 is mounted to an inner periphery of the bracket 6. One or multiple disks (three in illustration) D such as magnetic disks are held by the disk hub 3. In the above-mentioned structure, when the stator coil 4 is energized, the rotor magnet 5 is rotated by an electromagnetic force between the stator coil 4 and the rotor magnet 5. In accordance therewith, the disk hub 3 and the disks D held thereby are rotated integrally with the shaft member 2.

Figure 2:
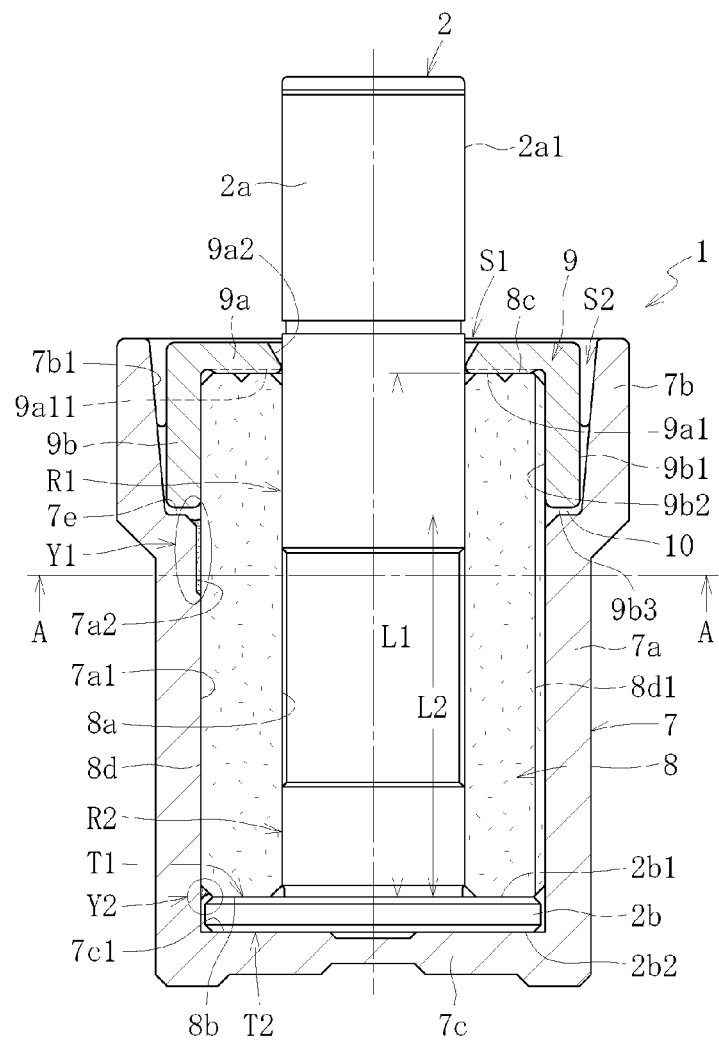
FIG. 2 is a sectional view of a fluid dynamic bearing device according to a first embodiment of the present invention.

FIG. 2 illustrates a first embodiment of the fluid dynamic bearing device 1 of the present invention. The fluid dynamic bearing device 1 includes, as main components, the housing 7, a bearing sleeve 8 fixed to an inner periphery of the housing 7, a shaft member 2 inserted along an inner periphery of the bearing sleeve 8 and rotated relatively to the housing 7 and the bearing sleeve 8, and a seal member 9 for sealing an opening portion of the housing 7. Note that, for the sake of convenience, description is made below on the assumption that the seal member 9 side is an upper side and the side axially opposite thereto is a lower side.

The shaft member 2 includes a shaft portion 2a and a flange portion 2b integrally or separately provided at a lower end of the shaft portion 2a. The entire shaft member 2 may be formed of a metal material such as stainless steel. Alternatively, there may be adopted a hybrid structure of a metal and a resin, in which the entire flange portion 2b or a part (both end surfaces, for example) thereof is formed of a resin.

The bearing sleeve 8 is cylindrically formed of a porous body of a sintered metal, in particular, a porous body of a sintered metal containing copper as a main component. The bearing sleeve 8 may be formed of a soft metal such as brass other than a sintered metal.

Figure 3A:
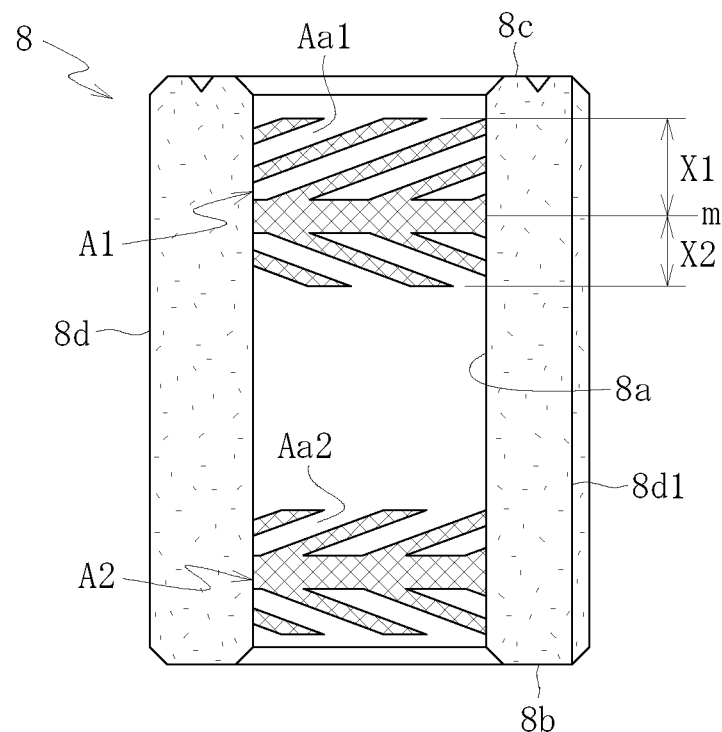
FIG. 3A is a sectional view of a bearing sleeve.

On an inner peripheral surface 8a of the bearing sleeve 8, cylindrical regions are separately provided at two portions in the axial direction so as to constitute radial bearing surfaces of first and second radial bearing portions R1 and R2. In the two regions, as illustrated in FIG. 3A, there are formed radial dynamic pressure generating portions A1 and A2 in which multiple dynamic pressure grooves Aa1 and Aa2 are arranged in a herringbone pattern, respectively. The dynamic pressure grooves Aa1 on the upper side are formed asymmetrically in the axial direction with respect to an axial center m (center in the axial direction of upper and lower inclined inter-groove regions). An axial dimension X1 of the upper region with respect to the axial direction center m is set to be larger than an axial dimension X2 of the lower region with respect to the axial direction center m. Meanwhile, the dynamic pressure grooves Aa2 on the lower side are formed symmetrically with each other in the axial direction, and the axial dimension of the upper and lower regions are equal to the above-mentioned axial dimension X2. Note that, the radial dynamic pressure generating portions A1 and A2 may be formed on an outer peripheral surface 2a1 of the shaft portion 2a opposed thereto, or may be constituted by multiple dynamic pressure grooves arranged in a spiral pattern or the like.

Figure 3B:
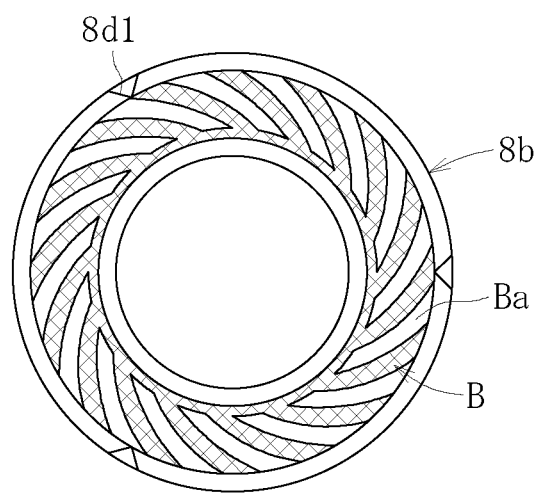
FIG. 3B illustrates a lower end surface of the bearing sleeve.

On a lower end surface 8b of the bearing sleeve 8, an annular region is provided so as to constitute a thrust bearing surface of a first thrust bearing portion T1. In the region, as illustrated in FIG. 3B, there is formed a thrust dynamic pressure generating portion B in which multiple dynamic pressure grooves Ba are arranged in a spiral pattern. The thrust dynamic pressure generating portion B may be formed on an upper end surface 2b1 of the flange portion 2b opposed thereto in the axial direction, or may be constituted by multiple dynamic pressure grooves arranged in a herringbone pattern or the like.

In an outer peripheral surface 8d of the bearing sleeve 8, there are formed one or multiple axial grooves 8d1 open in both the end surface 8b and an end surface 8c. In this embodiment, as illustrated in FIG. 3B, the axial grooves 8d1 are equiangularly arranged at three points in the circumferential direction. Further, on an upper-end outer peripheral portion, a lower-end outer peripheral portion, an upper-end inner peripheral portion, and a lower-end inner peripheral portion, there are provided respective chamfers. Of those, the chamfer provided on the lower-end outer peripheral portion corresponds to an outer peripheral chamfer 8e of the present invention.

The seal member 9 has a reverse-L-shape in cross section in which a disk-shaped first seal portion 9a and a cylindrical second seal portion 9b extending downward from a radially outer end of the first seal portion 9a are integrated, and is fixed to the upper-end outer periphery of the bearing sleeve 8. In a state of being fixed to the bearing sleeve 8 in the figure, a lower end surface 9b3 of the second seal portion 9b is opposed to a step surface 7e of the housing 7 through an intermediation of an axial gap 10. In a lower end surface 9a1 of the first seal portion 9a, there are radially provided one or multiple radial grooves 9a11.

A seal space S1 of a predetermined capacity is formed between an inner peripheral surface 9a2 of the first seal portion 9a and the outer peripheral surface 2a1 of the shaft portion 2a, and a second seal space S2 of a predetermined capacity is formed between an outer peripheral surface 9b1 of the second seal portion 9b and an inner peripheral surface 7b1 of a larger diameter portion 7b of the housing 7. Each of the inner peripheral surface 9a2 of the first seal portion 9a and the inner peripheral surface 7b1 of the larger diameter portion 7b of the housing 7 is decreased downward in inner diameter dimension so as to exhibit a tapered shape. Accordingly, each of the seal spaces S1 and S2 is decreased downward in diameter so as to exhibit a tapered shape.

The housing 7 exhibits a bottomed cylindrical shape (cup shape) in which a cylindrical side portion and a disk-shaped bottom portion 7c closing a lower end opening of the side portion are integrated with each other and in which an upper end thereof is opened. The side portion is constituted by a smaller diameter portion 7a having an inner periphery to which the bearing sleeve 8 is fixed, and the larger diameter portion 7b arranged above the smaller diameter portion 7a. An inner peripheral surface of the smaller diameter portion 7a is smaller in diameter than the inner peripheral surface 7b1 of the larger diameter portion 7b, and an outer peripheral surface of the smaller diameter portion 7a is smaller in diameter than an outer peripheral surface of the larger diameter portion 7b. The inner peripheral surface of the smaller diameter portion 7a is continuous with the inner peripheral surface 7b1 of the larger diameter portion 7b through the step surface 7e extending in a direction perpendicular to the axial line. The housing 7 is formed by injection-molding of a resin, and the portions 7a to 7c are formed to have a substantially uniform thickness so as to prevent deformation caused by difference in shrinking amount at the time of molding shrinkage. A resin material used for molding of the housing 7 is obtained by mixing, when necessary, various fillers such as a reinforcement and a conductivator with a thermoplastic resin as a base resin.

On an inner bottom surface 7c1 (upper end surface of bottom portion 7c) of the housing 7, an annular region is provided so as to constitute a thrust bearing surface of a second thrust bearing portion T2. While not shown in detail, in the region, there is formed a thrust dynamic pressure generating portion in which multiple dynamic pressure grooves are arranged, for example, in a spiral pattern. The thrust dynamic pressure generating portion is molded simultaneously with the injection molding of the housing 7. Note that, the thrust dynamic pressure generating portion may be formed on a lower end surface 2b2 of the flange portion 2b opposed thereto, or may be constituted by multiple dynamic pressure grooves arranged in a spiral pattern or the like.

Figure 4A:
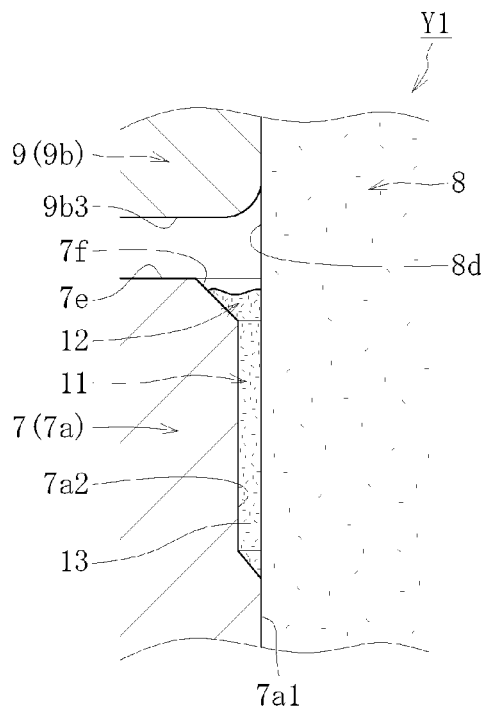
FIG. 4A is an enlarged sectional view of a part Y1 of FIG. 2.
Figure 4B:
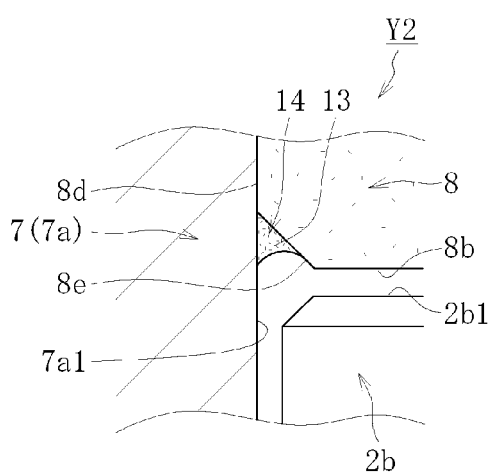
FIG. 4B is an enlarged sectional view of a part Y2 of FIG. 2.

As illustrated in FIG. 4A in an enlarged manner, an adhesive pool 11 filled with an adhesive 13 is provided between an inner peripheral surface of the smaller diameter portion 7a of the housing 7 and the outer peripheral surface 8d of the bearing sleeve 8, which are opposed to each other. Specifically, of the inner peripheral surface of the smaller diameter portion 7a, which is partitioned into a smaller-diameter inner peripheral surface 7a1 and the larger-diameter inner peripheral surface 7a2, the adhesive pool 11 is formed between the larger-diameter inner peripheral surface 7a2 and the outer peripheral surface 8d of the bearing sleeve 8 opposed thereto. Meanwhile, the bearing sleeve 8 is fixed by bonding through press-fitting (press-fit bonding) to the inner periphery of the smaller-diameter inner peripheral surface 7a1. Further, an inner peripheral chamfer 7f is provided on the inner peripheral portion of the smaller diameter portion 7a, and a first tapered space 12 formed between the inner peripheral chamfer 7f and the outer peripheral surface 8d of the bearing sleeve 8 is sealed with the adhesive 13. In addition, as illustrated in FIG. 4B in an enlarged manner, a second tapered space 14 formed between the outer peripheral chamfer 8e provided on the lower end outer peripheral portion of the bearing sleeve 8 and the smaller diameter-inner peripheral surface 7a1 of the housing 7 (smaller diameter portion 7a) is also sealed with the adhesive 13.

Figure 5:
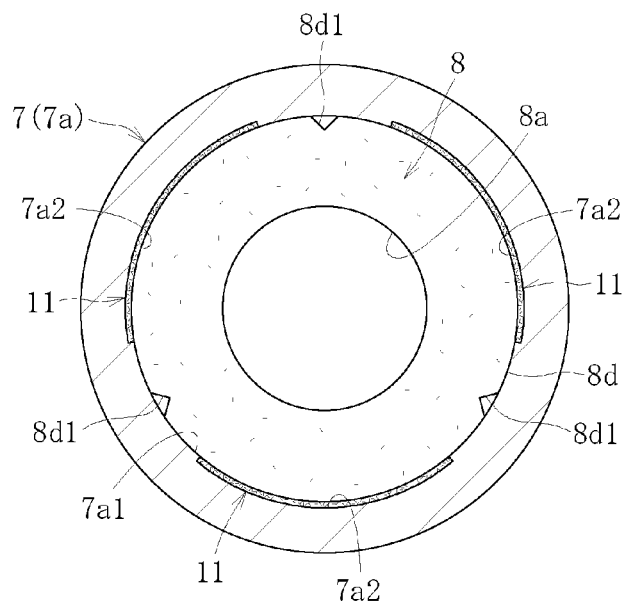
FIG. 5 is a sectional view taken along the line A-A of FIG. 2.

Incidentally, in this embodiment, in order to prevent axially extending fluid paths constituted by the axial grooves 8d1 provided in the outer peripheral surface 8d of the bearing sleeve 8 and the inner peripheral surface of the smaller diameter portion 7a of the housing 7 from being plugged with the adhesive 13 at the time of fixing the bearing sleeve 8 to the inner periphery of the housing 7 (smaller diameter portion 7a) by bonding, as illustrated in FIG. 5, the adhesive pools 11 each constituted by the larger-diameter inner peripheral surface 7a2 of the smaller diameter portion 7a are provided in three regions intermittently in the circumferential direction so that the fluid paths (axial grooves 8d1) are arranged between the adhesive pools 11 adjacent to each other in the circumferential direction. Further, while not shown in detail, the first tapered space 12 constituted by the inner peripheral chamfer 7f of the housing 7 and sealed with the adhesive 13, and the second tapered space 14 constituted by the outer peripheral chamfer 8e of the bearing sleeve 8 and sealed with the adhesive are each provided at three regions intermittently in the circumferential direction while substantially co-phased to each other in the circumferential direction (while overlapping with adhesive pools 11 in the axial direction). Note that, the inner peripheral chamfer 7f of the housing 7 and the outer peripheral chamfer 8e of the bearing sleeve 8 are provided over the entire circumference, and accordingly, in the first tapered space 12 and the second tapered space 14, there are provided portions sealed with the adhesive 13 (corresponding to sealed portions of the present invention) and portions not sealed with the adhesive 13 alternately to each other in the circumferential direction.

When the shaft member 2 is rotated in the fluid dynamic bearing device 1 structured as described above, the regions on the upper and lower two portions, which constitute radial bearing surfaces of the inner peripheral surface 8a of the bearing sleeve 8, are opposed to the outer peripheral surface 2a1 of the shaft portion 2a through an intermediation of the radial bearing gaps, respectively. In accordance with the rotation of the shaft member 2, the oil films formed in both the radial bearing gaps are increased in oil-film rigidity by dynamic pressure effect of the dynamic pressure grooves Aa1 and Aa2. The shaft member 2 is rotatably supported by the pressure in the radial direction in a non-contact manner. With this, the radial bearing portions R1 and R2 for rotatably supporting the shaft member 2 in the radial direction in a non-contact manner are separately formed in the two axial portions.

Further, simultaneously, between the annular region of the lower end surface 8b of the bearing sleeve 8, which constitutes the thrust bearing surface, and the upper end surface 2b1 of the flange portion 2b, and between the annular region of the inner bottom surface 7c1 of the housing 7, which constitutes the thrust bearing surface, and the lower end surface 2b2 of the flange portion 2b, there are formed first and second thrust bearing gaps, respectively. In accordance with the rotation of the shaft member 2, the oil films formed in both the thrust bearing gaps are increased in oil-film rigidity by dynamic pressure effect of the dynamic pressure grooves. The shaft member 2 is rotatably supported by the pressure in both the thrust directions in a non-contact manner. With this, there are formed the first thrust bearing portion T1 and the second thrust bearing portion T2 for rotatably supporting the shaft member 2 in the thrust directions in a non-contact manner.

Further, as described above, regarding the upper dynamic pressure grooves Aa1, the axial dimension X1 of the upper region with respect to the axial center m is larger than the axial dimension X2 of the lower region. Thus, at the time of rotation of the shaft member 2, the lubricating-oil drawing force in the upper region, which is exerted by the dynamic pressure grooves Aa1, is relatively larger than that in the lower region. Owing to the differential pressure of the drawing force, the lubricating oil filling the gap between the inner peripheral surface 8a of the bearing sleeve 8 and the outer peripheral surface 2a1 of the shaft portion 2a flows downward, circulates in the route constituted by the following: the first thrust bearing gap of the first thrust bearing portion T1; the fluid path constituted by the axial grooves 8d1 of the bearing sleeve 8; and the fluid path constituted by a radial grooves 9a11 of the first seal portion 9a, and is re-drawn into the radial bearing gap of the first radial bearing portion R1.

With this structure, pressure balance of the lubricating oil can be maintained. Simultaneously, it is possible to solve the problems such as generation of air bubbles involved in local generation of the negative pressure, and leakage of the lubricating oil and occurrence of vibration due to the generation of air bubbles. The above-mentioned circulation route communicates with the first seal space S1, and communicates with the second seal space S2 through the axial gap 10. Thus, even when air bubbles are mixed into the lubricating oil for some reason, the air bubbles are discharged into the atmosphere through the oil surfaces (gas/liquid interfaces) of the lubricating oil in the seal spaces S1 and S2 when the air bubbles circulate with the lubricant oil. Accordingly, adverse effect of the air bubbles is prevented even more effectively.

Further, as described above, each of the first and second seal spaces S1 and S2 is decreased in diameter to the inner side of the housing 7 so as to exhibit a tapered shape. Thus, the lubricating oil in both the seal spaces S1 and S2 is drawn in the direction of narrowing a gap width, that is, to the inner side of the housing 7 by drawing effect exerted by a capillary force. The seal spaces S1 and S2 have a buffer function of absorbing an amount of change in volume due to change in temperature of the lubricant oil filling the inner space of the housing 7, and an oil level of the lubricating oil is constantly maintained within the seal spaces S1 and S2 within an anticipated range of change in temperature. The above-mentioned structure effectively prevents leakage of the lubricating oil to the outside of the bearing.

The fluid dynamic bearing device 1 structured as described above is assembled, for example, by the following procedure. Note that, in the following, description is made mainly on a step of fixing the bearing sleeve 8 to the inner periphery of the housing 7, which is the gist of the present invention.

Figure 6:
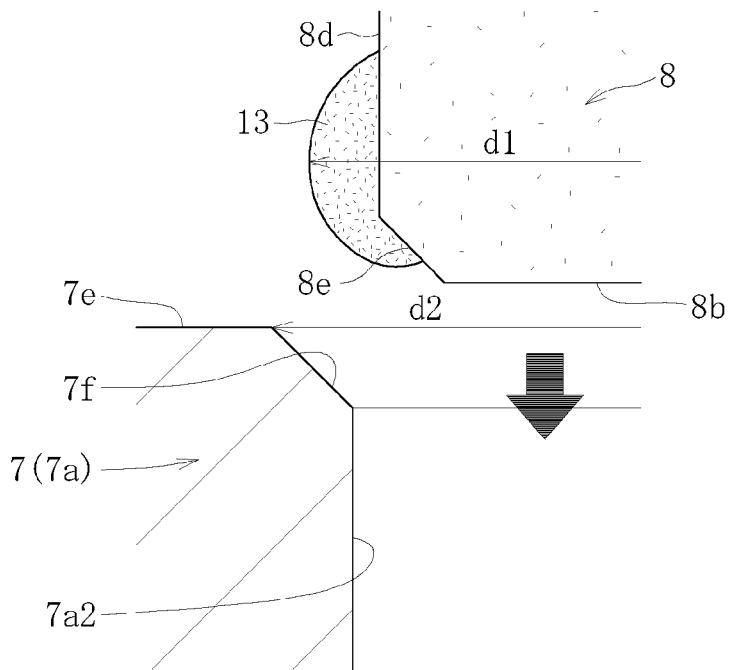
FIG. 6 is an enlarged sectional view of an essential part, which conceptually illustrates a stage immediately before the bearing sleeve is inserted along an inner periphery of a housing.

First, in a state in which the shaft member 2 is arranged on the inner periphery of the housing 7 (state in which shaft member 2 is placed on inner bottom surface 7c1 of housing 7), the bearing sleeve 8 is inserted along the smaller diameter portion 7a of the housing 7. Prior to insertion of the bearing sleeve 8 along the inner periphery of the housing 7, an appropriate amount of the adhesive 13 is applied to the outer peripheral surface 8d of the bearing sleeve 8, more specifically, as illustrated in FIG. 6, in a predetermined region of the outer peripheral surface 8d, which includes the outer peripheral chamfer 8e. Note that, the adhesive 13 is applied to the three regions circumferentially separated from each other (regions between axial grooves 8d1 circumferentially adjacent to each other). In this case, the bearing sleeve 8 and the housing 7 are made coaxial with each other, and in this state, the adhesive 13 is applied such that a maximum outer diameter d1 of the adhesive 13 is smaller than a maximum inner diameter d2 of the inner peripheral chamfer 7f of the housing 7. Further, in this embodiment, the adhesive 13 is applied such that the maximum outer diameter d1 of the adhesive 13 is larger than a minimum inner diameter of the inner peripheral chamfer 7f. Note that, examples of the usable adhesive 13 are not particularly limited as long as fixation strength necessary between the housing 7 and the bearing sleeve 8 can be secured, and include a thermosetting adhesive, an anaerobic adhesive, or an adhesive having both the curing properties.

Figure 7:
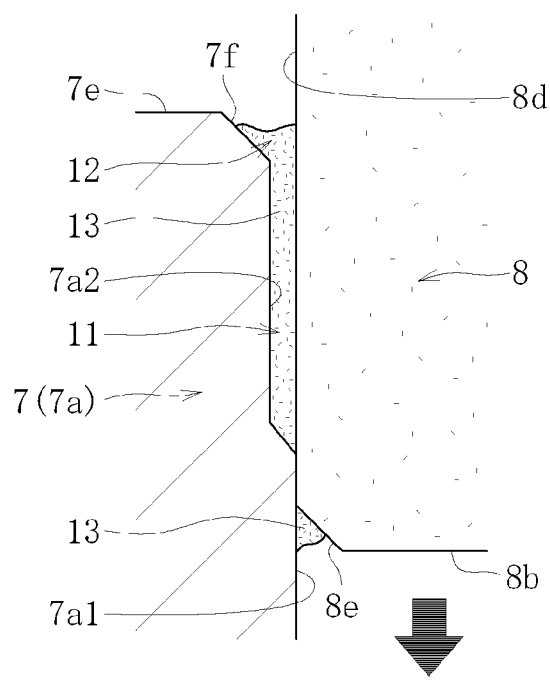
FIG. 7 is an enlarged sectional view of an essential part, which conceptually illustrates a stage during which the bearing sleeve is inserted along the inner periphery of the housing.

After application of the adhesive 13 to the bearing sleeve 8 in the above-mentioned mode, co-phasing is performed in the circumferential direction between the regions of the bearing sleeve 8, to which the adhesive 13 is applied, and the larger-diameter inner peripheral surface 7a2 of the smaller diameter portion 7a of the housing 7, and then, the bearing sleeve 8 is inserted along the inner periphery of the smaller diameter portion 7a of the housing 7. When the bearing sleeve 8 is inserted, the adhesive 13 applied to the bearing sleeve 8 comes into contact with the inner peripheral chamfer 7f of the housing 7, or with the step surface (inner peripheral chamfer 7f in this embodiment in which adhesive 13 is applied in the above-mentioned mode) connecting the smaller-diameter inner peripheral surface 7a1 and the larger-diameter inner peripheral surface 7a2 with each other. Thus, surface tension of the adhesive 13 is broken. As a result, a part of the adhesive 13 is supplied into the first tapered space 12 between the inner peripheral chamfer 7f of the housing 7 and the outer peripheral surface 8d of the bearing sleeve 8, and the adhesive pool 11 between the larger-diameter inner peripheral surface 7a2 of the housing 7 and the outer peripheral surface 8d of the bearing sleeve 8 (refer to FIG. 7).

In this case, the dimensional relationship between the adhesive 13 applied to the bearing sleeve 8 and the inner peripheral chamfer 7f of the housing 7 is set as described above. Thus, the situation is effectively prevented in which the adhesive 13 adheres to the step surface 7e of the housing 7 in accordance with the insertion of the bearing sleeve 8 along the inner periphery of the housing 7.

In accordance with progress of the insertion of the bearing sleeve 8, the adhesive 13 adhering to the outer peripheral chamfer 8e and the like of the bearing sleeve 8 is sequentially supplied between the outer peripheral surface 8d of the bearing sleeve 8 and the smaller-diameter inner peripheral surface 7a1 of the smaller diameter portion 7a. This is because, owing to the application of the adhesive 13 to the outer peripheral surface 8d of the bearing sleeve 8, movement of the adhesive 13, which is caused in accordance with the insertion of the bearing sleeve 8, occurs mainly in a direction on a rear side of the insertion direction of the bearing sleeve 8 in comparison with a front side of the insertion direction of the bearing sleeve 8. Thus, also in this embodiment in which the bearing sleeve 8 is press-fitted onto the smaller-diameter inner peripheral surface 7a1 of the housing 7, the adhesive 13 is effectively prevented from flowing around the bearing sleeve 8 to the closed side (side of thrust bearing portions) of the housing 7.

Note that, the adhesive 13 supplied between the housing 7 and the bearing sleeve 8 serves as a lubricant, and hence it is possible to smoothly progress the insertion (press-fitting) of the bearing sleeve 8 along the inner periphery of the smaller diameter portion 7a. The bearing sleeve 8 is inserted through press-fitting along the inner periphery of the smaller diameter portion 7a, and hence abrasion powder is generated in some cases owing to sliding contact therebetween. The adhesive 13 adhering to the outer peripheral chamfer 8e and the adhesive 13 supplied between the bearing sleeve 8 and the housing 7 catch the abrasion powder. Thus, the situation is effectively prevented in which the abrasion powder falls into the inner space of the housing 7 so as to become contaminants.

Then, after the insertion of the bearing sleeve 8 to a predetermined position in the axial direction of the housing 7 (after setting of thrust bearing widths of both thrust bearing portions T1 and T2), the adhesive 13 is cured so as to fix the housing 7 and the bearing sleeve 8 to each other, and the seal member 9 is fixed to the upper end outer periphery of the bearing sleeve 8. After assembly of the components as described above, the lubricating oil as a lubricating fluid is filled in the inner space of the housing 7 and in inner pores of the bearing sleeve 8. In this manner, the fluid dynamic bearing device 1 illustrated in FIG. 2 is completed.

As described above, in the present invention, the adhesive pools 11 are provided between the smaller diameter portion 7a of the housing 7 and the outer peripheral surface 8d of the bearing sleeve 8, which are opposed to each other. Each of the adhesive pools 11 can be formed by providing the larger-diameter inner peripheral surface 7a2 on the smaller diameter portion 7a, the dimension of the inner diameter of the larger-diameter inner peripheral surface 7a2 being larger than that of the axial region (smaller-diameter inner peripheral surface 7a1) in which the bearing sleeve 8 is fixed by press-fitting. In the axial region in which the larger-diameter inner peripheral surface 7a2 (adhesive pool 11) is provided, the radial clearance between the inner peripheral surface of the housing 7 and the outer peripheral surface of the bearing sleeve 8, which are opposed to each other, is larger than that in the other region. Accordingly, in the axial region in which the adhesive pool 11 is provided, it is possible to decrease an extrusion force of the adhesive 13 to the bottom portion 7c side of the housing 7 at the time of insertion of the bearing sleeve 8, and hence possible to decrease the amount of the adhesive 13 flowing around the bearing sleeve 8 to the bottom portion 7c side as a whole. Meanwhile, after the insertion of the bearing sleeve 8 is completed, an ample amount of the adhesive 13 is consequently interposed in the adhesive pool 11. As a result, it is possible to increase fixation strength (bonding strength) of the bearing sleeve 8 with respect to the housing 7.

In addition, on the inner peripheral portion of the housing 7, there is provided the inner peripheral chamfer 7f continuous with the upper end of the adhesive pool 11. The first tapered space 12 between the inner peripheral chamfer 7f and the bearing sleeve 8 is sealed with the adhesive 13. With this structure, the adhesive 13 supplied in the tapered space 12 can be smoothly supplied into the adhesive pool 11. In particular, in this embodiment, on the smaller diameter portion 7a of the housing 7, there is provided the larger-diameter inner peripheral surface 7a2 having the upper end continuous with the inner peripheral chamfer 7f so that the adhesive pool 11 is formed between the larger-diameter inner peripheral surface 7a2 and the outer peripheral surface 8d of the bearing sleeve 8. Thus, the adhesive pool 11 and the first tapered space 12 are linearly overlapped with each other in the axial direction, and hence the adhesive 13 is more smoothly supplied into the adhesive pool 11. Further, adhesive layers formed by curing of the adhesive 13 are superimposed on each other in the axial direction, and hence it is possible to further increase the bonding strength of the bearing sleeve 8 with respect to the housing 7.

Still further, the second tapered space 14 formed between the outer peripheral chamfer 8e of the bearing sleeve 8 and the smaller-diameter inner peripheral surface 7a1 of the housing 7 (smaller diameter portion 7a) is also sealed with the adhesive 13. With this, an ample amount of the adhesive 13 can be interposed at both end portions of the fitting region between the housing 7 and the bearing sleeve 8, and hence the fixation strength therebetween is further increased. With the above-mentioned structure, a sufficient amount of the adhesive 13 can be interposed between the inner peripheral surface of the housing 7 and the outer peripheral surface 8d of the bearing sleeve 8, which are opposed to each other. Thus, it is possible to increase the fixation strength of the bearing sleeve 8 with respect to the housing 7.

In particular, in the fluid dynamic bearing device 1 illustrated in FIG. 2, a fitting length L2 in the axial direction of the housing 7 and the bearing sleeve 8 is smaller than the entire dimension L1 of the bearing sleeve 8, and hence it is difficult to secure sufficient bonding strength between the housing 7 and the bearing sleeve 8. In this context, with the above-mentioned structure of the present invention, it is possible to provide a reliable fluid dynamic bearing device 1 which is capable of increasing, even in the case of adopting the above-mentioned structure, bonding strength of the bearing sleeve 8 with respect to the housing 7 and maintaining excellent bearing performance over a long period of time.

Further, the sealed portions sealed with the adhesive 13 (first tapered space 12 and second tapered space 14) and the adhesive pool 11 filled with the adhesive 13 are intermittently provided in the circumferential direction, and the axially extending fluid paths are formed in those intermittent portions. Even in the structure of the present invention in which the bearing sleeve 8 is fixed by bonding to the inner periphery of the housing 7, the situation does not occur in which the axial grooves 8d1 of the bearing sleeve 8, which constitute the fluid paths, are not plugged with the adhesive 13. Thus, the lubricating oil in the bearing smoothly flows and circulates.

Hereinbefore, description has been made on one of the embodiments of the fluid dynamic bearing device 1 to which the structure of the present invention is applied. The present invention is not restrictively applied to the fluid dynamic bearing device 1 structured as illustrated in FIG. 2.

Figure 8:
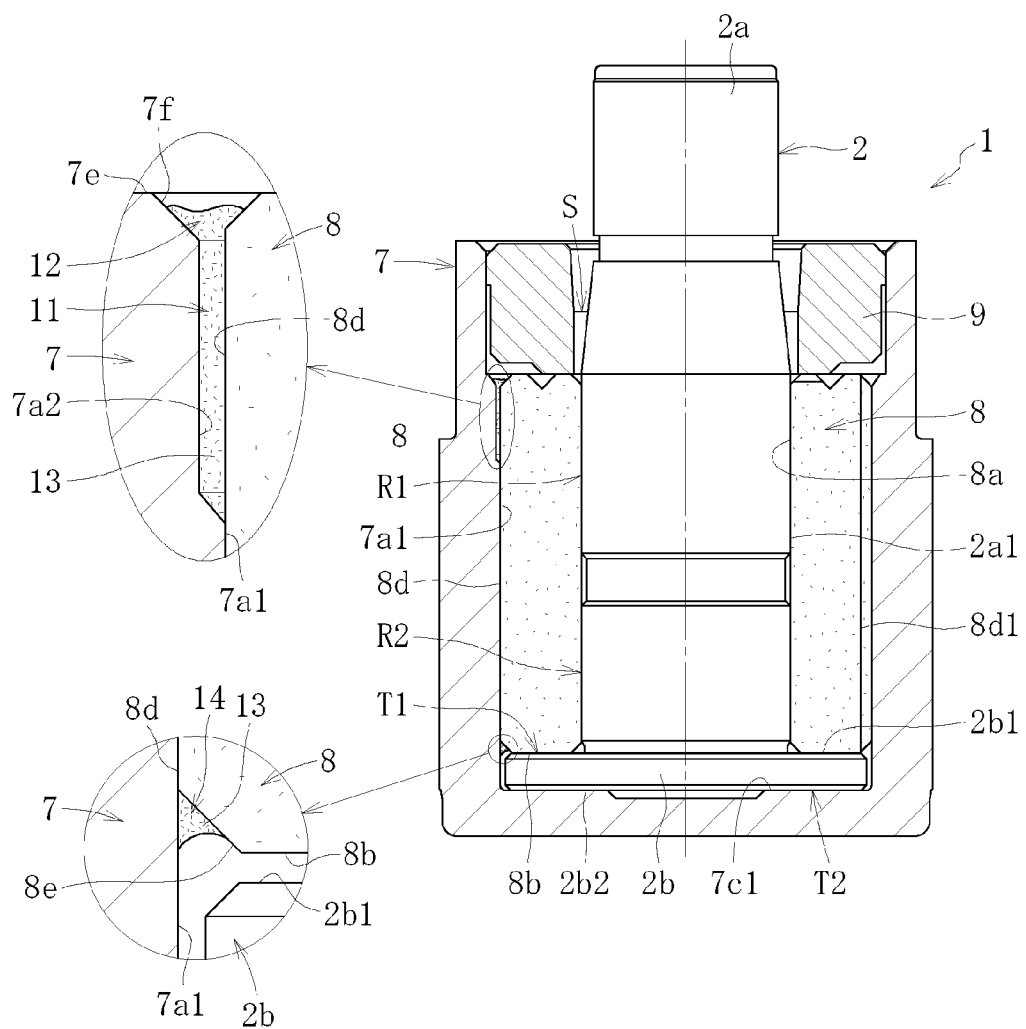
FIG. 8 is a sectional view of a fluid dynamic bearing device according to a second embodiment of the present invention.

FIG. 8 illustrates a fluid dynamic bearing device 1 according to a second embodiment of the present invention. The fluid dynamic bearing device 1 illustrated in the figure is structurally different from the fluid dynamic bearing device 1 illustrated in FIG. 2 mainly in that the bearing sleeve 8 is fitted to the inner periphery of the housing 7 over the entire length thereof and in that the seal member 9 is formed into a ring-like shape and is fixed to the inner periphery of the upper end of the housing 7 so that a single seal space S is formed between the inner peripheral surface of the seal member 9 and the outer peripheral surface 2a1 of the shaft portion 2a opposed thereto. In the fluid dynamic bearing device 1 structured as described above, the fitting length in the axial direction of the bearing sleeve 8 with respect to the housing 7 is large, and the seal member 9 is fixed on the upper side of the bearing sleeve 8. Thus, the detachment resistance of the shaft member 2 is higher than that of the fluid dynamic bearing device 1 illustrated in FIG. 2. By adopting the structure of the present invention, it is possible to further increase the detachment resistance of the shaft member 2. Note that, other structural details are substantially the same as those described above, and hence the same reference symbols are given so that redundant description thereof is omitted.

In the embodiments described hereinbefore, for the purpose of preventing the situation in which the axially extending fluid paths constituted by the axial grooves 8d1 provided in the outer peripheral surface 8d of the bearing sleeve 8 are plugged with the adhesive 13 used in fixing the bearing sleeve 8 to the inner periphery of the housing 7, the adhesive pools 11 and the first and second tapered spaces 12 and 14 sealed with the adhesive 13 are intermittently provided in the circumferential direction. When it is unnecessary to cause the lubricating oil to flow and circulate in the bearing, that is, between the inner peripheral surface of the housing 7 and the outer peripheral surface 8d of the bearing sleeve 8, which are opposed to each other, it is possible to provide the adhesive pools 11 over the entire circumference, and to seal the first and second tapered spaces 12 and 14 with the adhesive 13 over the entire circumference. With this, the fixation strength can be further increased between the bearing sleeve 8 with respect to the housing 7.

Further, in the description hereinbefore, the structure is exemplified in which, in the radial bearing portions R1 and R2, the dynamic pressure grooves arranged in a herringbone pattern or the like generate dynamic pressure in the lubricating oil filling the radial bearing gaps. However, so-called step bearings, multi-arc bearings, or non-cylindrical bearings may be adopted as the radial bearing portions R1 and R2. Alternatively, the radial bearing portions may be provided in two regions separated from each other in the axial direction as described above, or may be provided in one region, or in three or more regions in the axial direction. In addition, circular bearings without dynamic pressure generating portions may be adopted as the radial bearing portions.

Further, the structure is exemplified in which, in the thrust bearing portions T1 and T2, the dynamic pressure grooves arranged in a spiral pattern or the like generate dynamic pressure in the lubricating oil filling the thrust bearing gaps. Any one of or both the thrust bearing portions T1 and T2 may be constituted by so-called step bearings or wave bearings. Further, the thrust bearing portions may be constituted, instead of the fluid dynamic bearings as described above, by so-called pivot bearings supporting one end of the shaft member 2 in a contact manner.

DESCRIPTION OF REFERENCE SYMBOLS 1 fluid dynamic bearing device
2 shaft member
7 housing
7a smaller diameter portion
7a2 larger-diameter inner peripheral surface
7c bottom portion
7f inner peripheral chamfer
8 bearing sleeve
8e outer peripheral chamfer
11 adhesive pool
12 first tapered space
13 adhesive
14 second tapered space
R1, R2 radial bearing portion
T1, T2 thrust bearing portion

The invention claimed is:

1. A fluid dynamic bearing device, comprising:
a housing having a bottomed cylindrical shape with one open end in an axial direction and another end in the axial direction closed with a bottom portion;
a bearing sleeve fixed to an inner periphery of the housing; and
a shaft member inserted along an inner periphery of the bearing sleeve, the shaft member being supported in a radial direction by oil films formed in radial bearing gaps between an inner peripheral surface of the bearing sleeve and an outer peripheral surface of the shaft member, the oil films being formed in accordance with a relative rotation of the bearing sleeve and the shaft member, and the housing being mounted to an inner periphery of a bracket supporting a stator coil,
wherein:
an adhesive pool filled with an adhesive is provided between an inner peripheral surface of the housing and an outer peripheral surface of the bearing sleeve, which are opposed to each other;
an inner peripheral chamfer is provided on an inner peripheral portion of the housing, the inner peripheral chamfer having, on a bottom portion side of the housing, an end portion continuous with the adhesive pool;
a first tapered space sealed with the adhesive is provided between the inner peripheral chamfer and the outer peripheral surface of the bearing sleeve which opposes the inner peripheral chamfer;
a second tapered space sealed with the adhesive is provided between an outer peripheral chamfer provided on an outer peripheral portion of the bearing sleeve on the bottom side of the housing and the inner peripheral surface of the housing which opposes the outer peripheral chamfer; and
the housing and the bearing sleeve are fixed by the adhesive in an axial region between the adhesive pool and the second tapered space.

2. A fluid dynamic bearing device according to claim 1, wherein:
a larger-diameter inner peripheral surface having an end portion on an opening side of the housing, which is continuous with the inner peripheral chamfer, is provided on the inner peripheral surface of the housing; and the adhesive pool is formed between the larger-diameter inner peripheral surface and the outer peripheral surface of the bearing sleeve.

3. A fluid dynamic bearing device according to claim 1 or 2, wherein:
the adhesive pool filled with the adhesive and sealed portions sealed with an adhesive are provided intermittently in a circumferential direction; and
fluid paths opened in both end surfaces of the bearing sleeve are provided in the intermittent portions.

4. A fluid dynamic bearing device according to claim 1, wherein:
the shaft member is provided with a flange portion; and
a thrust bearing gap is formed between an end surface on the bottom portion side of the housing of the bearing sleeve and one end surface of the flange portion opposite thereto.

5. A fluid dynamic bearing device according to claim 1, wherein a fitting length in an axial direction of the bearing sleeve with respect to the housing is smaller than an entire length in the axial direction of the bearing sleeve.

6. A manufacturing method for a fluid dynamic bearing device comprising a housing having a bottomed cylindrical shape with one open end in an axial direction and another end in the axial direction closed with a bottom portion; a bearing sleeve fixed to an inner periphery of the housing; and a shaft member inserted along an inner periphery of the bearing sleeve, the manufacturing method comprising:
inserting the bearing sleeve having an outer peripheral chamfer provided on an outer peripheral portion on a bottom side of the housing and an outer peripheral surface on the bottom side of the housing applied with an adhesive along the inner periphery of the housing so as to supply the adhesive into a first tapered space provided between an inner peripheral chamfer provided on an inner peripheral portion of the housing and an outer peripheral surface of the bearing sleeve which opposes the inner peripheral chamfer, an adhesive pool arranged adjacently to the first tapered space on the bottom side of the housing and formed between an inner peripheral surface of the housing and the outer peripheral surface of the bearing sleeve, which are opposed to each other, a second tapered space formed between the outer peripheral chamfer and the inner peripheral surface of the housing which opposes the outer peripheral chamber, and an axial region between the adhesive pool and the second tapered space, and thereafter curing the adhesive thus supplied.

7. A manufacturing method for a fluid dynamic bearing device according to claim 6,
wherein, said inserting the bearing sleeve compromises inserting the bearing sleeve along the inner periphery of the housing while a maximum outer diameter of the adhesive applied to the bearing sleeve is maintained to be smaller than a maximum inner diameter of the inner peripheral chamfer and to be larger than a minimum inner diameter of the inner peripheral chamfer.

\* \* \* \* \*